(12) United States Patent
Kim

(10) Patent No.: US 9,484,153 B2
(45) Date of Patent: Nov. 1, 2016

(54) MULTILAYER CERAMIC ELECTRONIC COMPONENT HAVING A PLURALITY OF INTERNAL ELECTRODES AND METHOD FOR MANUFACTURING THE SAME

(71) Applicant: SAMSUNG ELECTRO-MECHANICS CO., LTD., Suwon, Gyunggi-do (KR)

(72) Inventor: Hyung Joon Kim, Gyunggi-do (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 232 days.

(21) Appl. No.: 13/779,651

(22) Filed: Feb. 27, 2013

(65) Prior Publication Data

US 2014/0177127 A1    Jun. 26, 2014

(30) Foreign Application Priority Data

Dec. 20, 2012    (KR) .......................... 10-2012-0149936

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC .............. *H01G 4/30* (2013.01); *H01G 4/0085* (2013.01); *H01G 4/012* (2013.01); *H01G 4/12* (2013.01)

(58) Field of Classification Search
CPC ........ H01G 4/30; H01G 4/12; H01G 4/0085; H01G 4/012
See application file for complete search history.

(56) References Cited

U.S. PATENT DOCUMENTS

| | | | | |
|---|---|---|---|---|
| 4,424,615 | A | * | 1/1984 | Wakino .................... 29/25.42 |
| 5,040,092 | A | * | 8/1991 | Katho et al. ............... 361/321.2 |
| 5,170,317 | A | * | 12/1992 | Yamada ................. H01G 4/255 |
| | | | | 29/25.42 |
| 5,933,318 | A | * | 8/1999 | Tomono et al. .............. 361/323 |
| 7,394,644 | B2 | | 7/2008 | Kojima |
| 2004/0066603 | A1 | | 4/2004 | Saito et al. |

(Continued)

FOREIGN PATENT DOCUMENTS

| | | |
|---|---|---|
| CN | 1781170 A | 5/2006 |
| CN | 1870190 A | 11/2006 |

(Continued)

OTHER PUBLICATIONS

Korean Office Action issued in Korean Application No. 10-2012-0149936 dated Feb. 13, 2014, w/English translation.

(Continued)

*Primary Examiner* — David M Sinclair
(74) *Attorney, Agent, or Firm* — McDermott Will & Emery LLP

(57) ABSTRACT

There is provided a multilayer ceramic electronic component including: a ceramic body including a plurality of dielectric layers; and a plurality of first and second internal electrodes disposed to face each other with the dielectric layer interposed therebetween within the ceramic body and having different widths, wherein three or more of the plurality of first and second internal electrodes form a single block, the blocks are iteratively laminated, and when the longest distance between the uppermost internal electrode and the lowermost internal electrode, among the plurality of first and second internal electrodes 121 and 122, is T1 and the shortest distance therebetween is T2, $0.76 \leq T2/T1 \leq 0.97$ is satisfied.

12 Claims, 3 Drawing Sheets

(56) References Cited

U.S. PATENT DOCUMENTS

2006/0180269 A1    8/2006   Karatsu et al.
2006/0256504 A1*  11/2006   Kojima .................. 361/311
2012/0306325 A1*  12/2012   Kim ..................... 310/366
2013/0242460 A1*   9/2013   Lee et al. ............... 361/303

FOREIGN PATENT DOCUMENTS

| JP | 6-84689 A | | 3/1994 |
| JP | 8-273973 A | | 10/1996 |
| JP | 9-129486 A | | 5/1997 |
| JP | 9-260202 A | | 10/1997 |
| JP | 11214244 A | * | 8/1999 |
| JP | 11-297566 A | | 10/1999 |
| JP | 2000040634 A | * | 2/2000 |
| JP | 2000-124057 A | | 4/2000 |
| JP | 2001044059 A | * | 2/2001 |
| JP | 2002-15942 A | | 1/2002 |
| JP | 2003264119 A | * | 9/2003 |
| JP | 2004-022859 A | | 1/2004 |
| JP | 2004-39840 A | | 2/2004 |
| JP | 2007-173725 A | | 7/2007 |
| JP | 2008091400 A | * | 4/2008 |
| JP | 2008-103448 A | | 5/2008 |

OTHER PUBLICATIONS

Japanese Office Action issued in Japanese Application No. 2013-035409 dated Feb. 4, 2014, w/English translation.
Japanese Decision of Rejection issued in correspsonding Japanese Application No. 2013-035409, dated Jul. 8, 2014, with English translation.
Japanese Office Action issued in Japanese Application No. 2014-227095 dated Oct. 6, 2015, with English Translation.
Chinese Office Action issued in Chinese Application No. 2013100885373, dated Mar. 18, 2016, with English translation.

* cited by examiner

MULTILAYER CERAMIC ELECTRONIC COMPONENT HAVING A PLURALITY OF INTERNAL ELECTRODES AND METHOD FOR MANUFACTURING THE SAME

CROSS-REFERENCE TO RELATED APPLICATIONS

This application claims the priority of Korean Patent Application No. 10-2012-0149936 filed on Dec. 20, 2012, in the Korean Intellectual Property Office, the disclosure of which is incorporated herein by reference.

BACKGROUND OF THE INVENTION

1. Field of the Invention

The present invention relates to a multilayer ceramic electronic component having excellent reliability and a manufacturing method thereof.

2. Description of the Related Art

Recently, as electronic products have been reduced in size, multilayer ceramic electronic components have also been required to be reduced in size and have a large capacity.

Thus, dielectric layers and internal electrodes have been attempted to be thinned and stacked in larger amounts according to various methods, and recently, multilayer ceramic electronic components having a larger number of laminations by reducing a thickness of dielectric layers have been manufactured.

Meanwhile, a multilayer ceramic electronic component, in particular, a multilayer ceramic capacitor, is manufactured by printing an internal electrode, smaller than an area of a ceramic sheet or a substrate sheet and having a predetermined thickness, on the ceramic sheet or the substrate sheet, and laminating the sheets, and as an amount of laminations is increased, steps formed by margin portions are increased.

Thus, since the steps formed by the margin portions are increased according to an increase in the lamination amount, dielectric layers and internal electrodes are unbalanced, resulting in a degradation of electrical characteristics.

Also, as the lamination amount is increased, the electrodes within a multilayer ceramic capacitor may be warped in the direction of end portions of a ceramic body due to the steps, and thus, delamination occurs when the ceramic body is cut.

The related art document below discloses a technique of laminating internal electrodes such that positions of the internal electrodes deviate in a width direction of a ceramic body, but it is not a basic solution to the foregoing problem.

Thus, a method for solving the problem of delamination in cutting and a problem resulting from an increase in the steps formed by the margin portion when cut is required.

RELATED ART DOCUMENT (Patent Document 1) Japanese Patent Laid Open Publication No. 2004-022859

SUMMARY OF THE INVENTION

An aspect of the present invention provides a multilayer ceramic electronic component having excellent reliability and a manufacturing method thereof.

According to an aspect of the present invention, there is provided a multilayer ceramic electronic component including: a ceramic body including a plurality of dielectric layers; and a plurality of first and second internal electrodes disposed to face each other with the dielectric layer interposed therebetween within the ceramic body and having different widths, wherein three or more of the plurality of first and second internal electrodes form a single block, the blocks are iteratively laminated, and when the longest distance between the uppermost internal electrode and the lowermost internal electrode, among the plurality of first and second internal electrodes 121 and 122, is T1 and the shortest distance therebetween is T2, $0.76 \leq T2/T1 \leq 0.97$ is satisfied.

An amount of the blocks may be 5 or more.

When the longest distance between the uppermost internal electrode and the lowermost internal electrode, among the plurality of first and second internal electrodes 121 and 122, is T1 and the shortest distance therebetween is T2, $0.85 \leq T2/T1 \leq 0.90$ may be satisfied.

A lamination amount of the plurality of first and second internal electrodes may be 150 layers or more.

The internal electrodes may include one or more metals selected from the group consisting of palladium (Pd), a palladium-silver (Pd—Ag) alloy, nickel (Ni), and copper (Cu).

According to another aspect of the present invention, there is provided a method for manufacturing a multilayer ceramic electronic component, including: preparing a plurality of ceramic green sheets with slurry including ceramic powder; forming first and second internal electrode patterns having different widths with a conductive paste including a metal powder on the plurality of ceramic green sheets; laminating three or more of the plurality of ceramic green sheets to form a plurality of block laminates; and laminating the plurality of block laminates and firing the same to form a ceramic body including a plurality of first and second internal electrodes, wherein when the longest distance between the uppermost internal electrode and the lowermost internal electrode, among the plurality of first and second internal electrodes 121 and 122, within the ceramic body is T1 and the shortest distance therebetween is T2, $0.76 \leq T2/T1 \leq 0.97$ is satisfied.

The method may further include compressing the block laminates after the forming of the plurality of block laminates.

The first and second internal electrode patterns may be disposed to have the same form within the respective blocks.

An amount of the block laminates may be 5 or more.

When the longest distance between the uppermost internal electrode and the lowermost internal electrode, among the plurality of first and second internal electrodes, is T1 and the shortest distance therebetween is T2, $0.85 \leq T2/T1 \leq 0.90$ may be satisfied.

A lamination amount of the plurality of first and second internal electrodes may be 150 layers or more.

The metal powder may include one or more selected from the group consisting of palladium (Pd), a palladium-silver (Pd—Ag) alloy, nickel (Ni), and copper (Cu).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
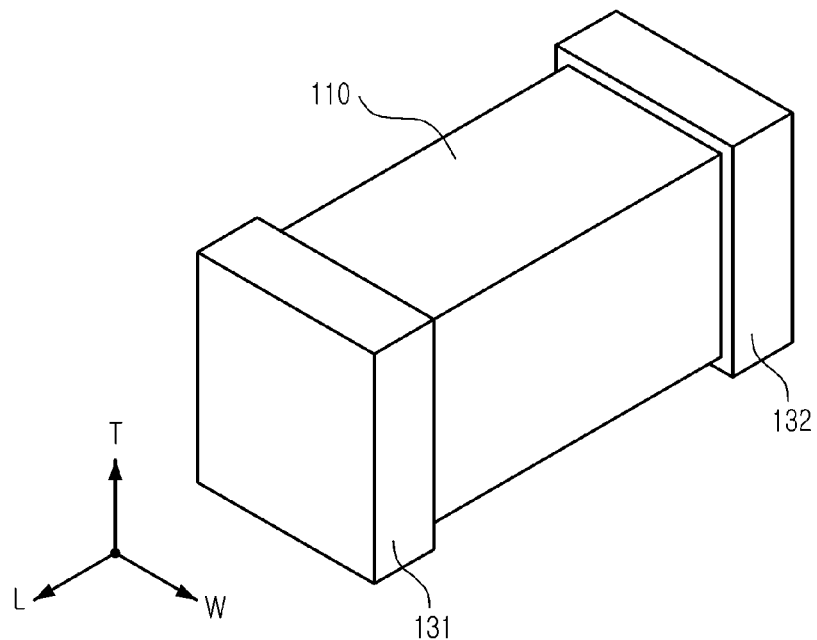
FIG. 1 is a schematic perspective view of a multilayer ceramic capacitor (MLCC) according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a schematic perspective view of a multilayer ceramic capacitor (MLCC) according to an embodiment of the present invention.

Figure 2:
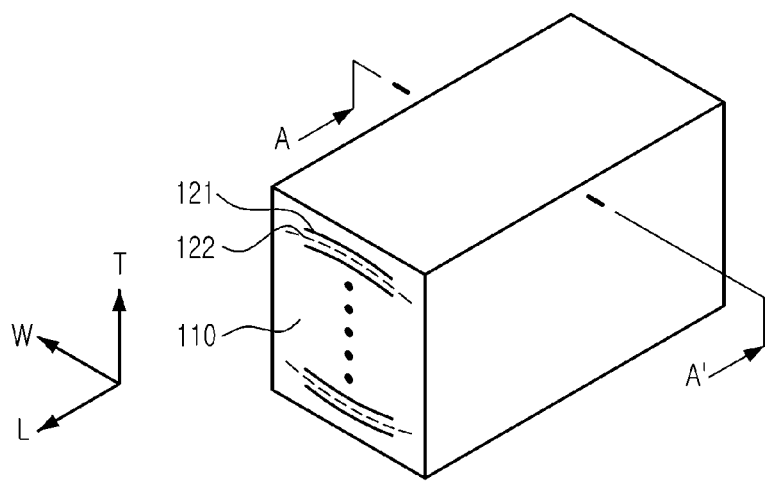
FIG. 2 is a schematic perspective view of a ceramic body of the MLCC according to an embodiment of the present invention.

FIG. 2 is a schematic perspective view of a ceramic body of the MLCC according to an embodiment of the present invention.

Figure 3:
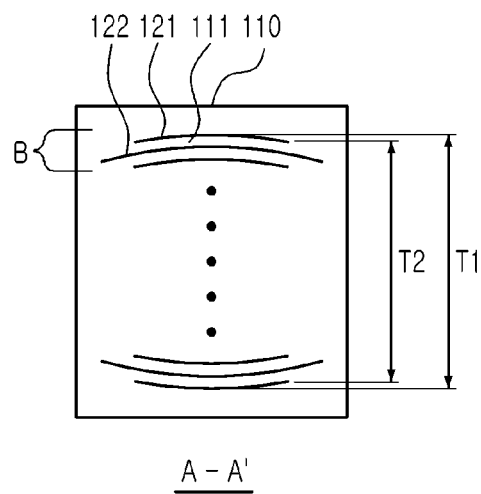
FIG. 3 is a cross-sectional view taken along line A-A' in FIG. 2.
Figure 4:
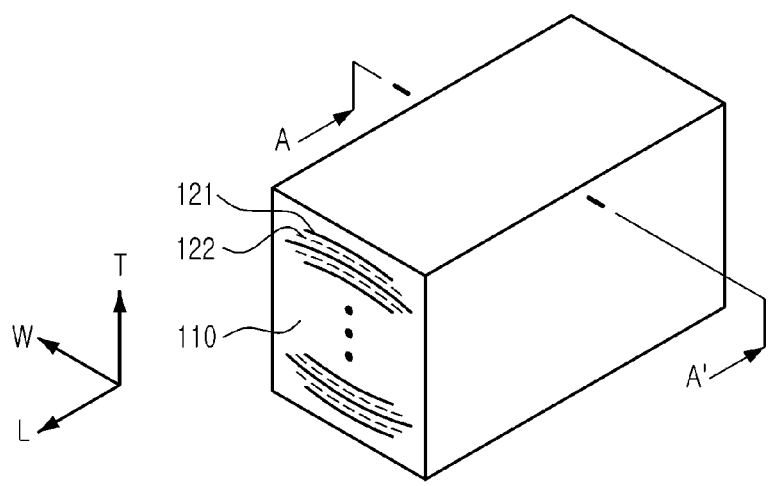
FIG. 4 is a schematic perspective view of a ceramic body of an MLCC according to another embodiment of the present invention.

FIG. 3 is a cross-sectional view taken along line A-A' in FIG. 2;

FIG. 4 is a schematic perspective view of a ceramic body of an MLCC according to another embodiment of the present invention.

Figure 5:
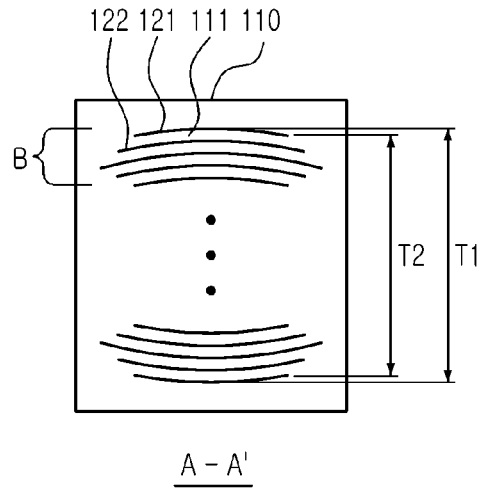
FIG. 5 is a cross-sectional view taken along line A-A' in FIG. 4.

FIG. 5 is a cross-sectional view taken along line A-A' in FIG. 4.

Figure 6:
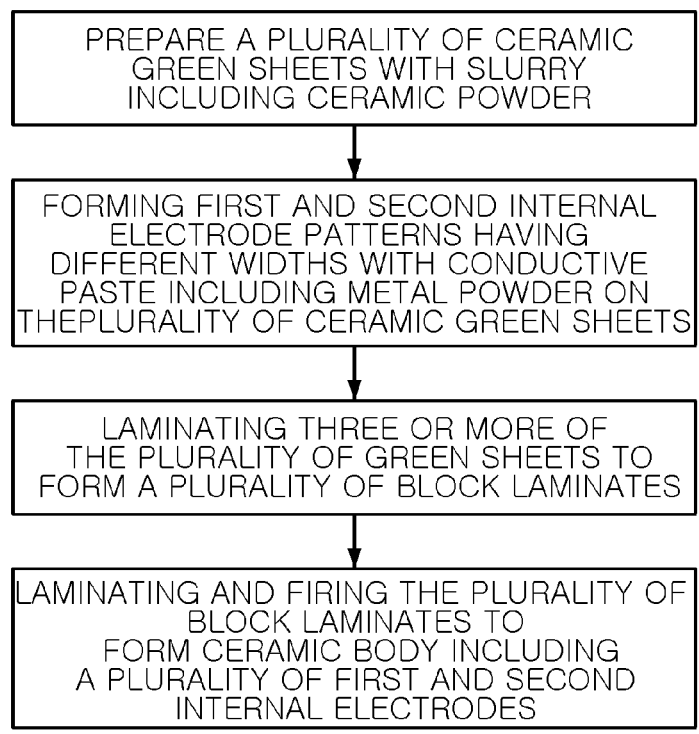
FIG. 6 is a flow chart illustrating a process of a manufacturing an MLCC according to another embodiment of the present invention.

FIG. 6 is a flow chart illustrating a process of a manufacturing an MLCC according to another embodiment of the present invention.

Referring to FIGS. 1 through 5, a multilayer ceramic electronic component according to an embodiment of the present invention may include: a ceramic body 110 including a plurality of dielectric layers 111; and a plurality of first and second internal electrodes 121 and 122 disposed to face each other with the dielectric layer 111 interposed therebetween within the ceramic body 110 and having different widths, wherein three or more of the plurality of first and second internal electrodes 121 and 122 form a single block, the blocks are iteratively laminated, and when the longest distance between the uppermost internal electrode and the lowermost internal electrode, among the plurality of first and second internal electrodes 121 and 122, is T1 and the shortest distance therebetween is T2, $0.76 \leq T2/T1 \leq 0.97$ is satisfied.

Hereinafter, a multilayer ceramic electronic component according to an embodiment of the present invention will be described. In particular, a multilayer ceramic capacitor (MLCC) will be described as an example, but the present invention is not limited thereto.

The ceramic body 110 is not particularly limited and may have, for example, a hexahedral shape.

Meanwhile, in the multilayer ceramic capacitor (MLCC) according to an embodiment of the present invention, it is defined that a 'length direction' is the 'L' direction, a 'width direction' is the 'W' direction, and a 'thickness direction' is the 'T' direction in FIG. 1. Here, the 'thickness direction' may be used to have the same concept as a 'lamination direction' in which dielectric layers are laminated.

The MLCC according to an embodiment of the present invention may include: a ceramic body 110 including a plurality of dielectric layers 111; and a plurality of first and second internal electrodes 121 and 122 disposed to face each other with the dielectric layer 111 interposed therebetween within the ceramic body and having different widths, According to an embodiment of the present invention, the ceramic body 110 may be formed by laminating a plurality of dielectric layers. The plurality of dielectric layers 111 constituting the ceramic body 110 are in a sintered state in which adjacent dielectric layers are integrated such that boundaries therebetween may not be readily apparent.

The dielectric layers 111 may be formed by firing ceramic green sheets including ceramic powder, an organic solvent, and an organic binder. The ceramic powder is a material having a high K-dielectric constant (or high permittivity), and as the ceramic powder, for example, a barium titanate ($BaTiO_3$)-based material, a strontium titanate ($SrTiO_3$)-based material, or the like, may be used, but the present invention is not limited thereto.

The plurality of first and second internal electrodes 121 and 122 may be formed with a conductive paste including one or more of materials among, for example, a precious metal such as palladium (Pd), a palladium-silver (Pd—Ag) alloy, and the like, and nickel (Ni) and copper (Cu), but the present invention is not particularly limited.

In order to form capacitance, first and second external electrodes 131 and 132 may be formed on outer surfaces of the ceramic body 110 and electrically connected to the plurality of first and second internal electrodes 121 and 122.

The first and second external electrodes 131 and 132 may be made of the same conductive material as that of the internal electrodes, but the present invention is not limited thereto and the first and second external electrodes 131 and 132 may be made of, for example, copper (Cu), silver (Ag), nickel (Ni), or the like.

The first and second external electrodes 131 and 132 may be formed by applying a conductive paste prepared by adding glass frit to the metal powder and firing the same.

According to an embodiment of the present invention, the plurality of first and second internal electrodes 121 and 122 may have different widths.

As mentioned above, by forming the first and second internal electrodes 121 and 122 such that they have different widths, a step of a margin portion in which no internal electrode is formed in the width direction of the ceramic body 110 can be minimized.

Thus, an imbalance between the dielectric layers 111 and the plurality of first and second internal electrodes 121 and 122 can be resolved, implementing an MLCC having excellent reliability.

According to an embodiment of the present invention, three or more of the plurality of first and second internal electrodes 121 and 122 form a single block B, and the blocks are iteratively laminated. When the longest distance between the uppermost internal electrode and the lowermost internal electrode, among the plurality of first and second internal electrodes 121 and 122, is T1 and the shortest distance therebetween is T2, $0.76 \leq T2/T1 \leq 0.97$ may be satisfied.

Three or more of the plurality of first and second internal electrodes 121 and 122 form a single block B, but the present invention is not limited thereto and various numbers of first and second internal electrodes 121 and 122 may be determined as a single block B.

An amount of blocks may be 5 or more, but the present invention is not limited thereto and an amount of blocks may be determined in consideration of capacitance of the MLCC.

Also, the block B is iteratively laminated, and the ceramic body 110 may be formed by iteratively laminating the blocks B.

FIGS. 2 and 3 illustrate a case in which a single block includes a total of three first and second internal electrodes 121 and 122, and FIGS. 4 and 5 illustrate a case in which a single block includes a total of five first and second internal electrodes 121 and 122 according to another embodiment of the present invention.

Referring to FIGS. 2 and 3, when the total number of the first and second internal electrodes 121 and 122 included in a single block is 3, the first internal electrode, the second internal electrode, and the first internal electrode are sequentially laminated, and in this case, the second internal electrode may have a width greater than that of the first internal electrodes.

Referring to FIGS. 4 and 5, when the total number of the first and second internal electrodes 121 and 122 included in a single block is 5, the first internal electrode, the second internal electrode, the first internal electrode, the second internal electrode, and the first internal electrode are sequentially laminated, and in this case, the middle first internal electrode may have the greatest width, the second electrodes laminated on upper and lower portions of the first internal electrode having the greatest width may have a smaller width, and the outermost first internal electrodes may have the smallest width.

Since a total of the three to five or more of the first and second internal electrodes 121 and 122 is determined as a single block B, and a plurality of the same blocks B are laminated to form the ceramic body 110, an imbalance between the dielectric layers 111 and the plurality of first and second internal electrodes 121 and 122 can be resolved, implementing the MLCC having excellent reliability.

A lamination amount of the plurality of first and second internal electrodes 121 and 122 is not particularly limited. For example, it may be 150 layers or more.

In particular, since three or more of the plurality of first and second internal electrodes 121 and 122 form a single block B and the blocks B are iteratively laminated, when the longest distance between the uppermost internal electrode and the lowermost electrode, among the plurality of first and second internal electrodes 121 and 122, is T1 and the shortest distance therebetween is T2, $0.76 \leq T2/T1 \leq 0.97$ may be satisfied.

In general, as the lamination amount in the MLCC is increased, a step between the electrode formation portion and the margin portion as an electrode non-formation portion in the width direction of the ceramic body is increased.

The step may cause delamination when the ceramic body is cut, severely degrading reliability of the MLCC.

According to an embodiment of the present invention, when the longest distance between the uppermost internal electrode and the lowermost internal electrode, among the plurality of first and second internal electrodes 121 and 122, is T1 and the shortest distance therebetween is T2, T1 and T2 are adjusted to satisfy $0.76 \leq T2/T1 \leq 0.97$, thus reducing a step between the electrode formation portion and the electrode non-formation portion in the width direction of the ceramic body.

Thus, a delamation defect problem generated when the ceramic body is cut can be improved, implementing an MLCC having excellent reliability.

Referring to FIG. 3, the longest distance T1 between the uppermost internal electrode and the lowermost electrode among the plurality of first and second internal electrodes 121 and 122 may be defined as the longest distance in the thickness direction between the outermost internal electrodes among the plurality of first and second internal electrodes 121 and 122 laminated within the ceramic body 110.

The plurality of first and second internal electrodes 121 and 122 are warped in the thickness direction of the ceramic body 110 and, in this case, the longest distance and the shortest distance exist between the outermost internal electrodes among the plurality of first and second internal electrodes 121 and 122 in the thickness direction of the ceramic body 110.

According to an embodiment of the present invention, T1 may be defined as the longest distance between the outermost internal electrodes, among the plurality of first and second internal electrodes 121 and 122 laminated within the ceramic body 110 in the thickness direction.

Meanwhile, since the plurality of first and second internal electrodes 121 and 122 are warped in the thickness direction of the ceramic body 110, the uppermost and lowermost internal electrodes may respectively have the highest point and the lowest point in the thickness direction of the ceramic body 110.

According to an embodiment of the present invention, in the uppermost and lowermost internal electrodes, an interval between the lowest points in the thickness direction of the ceramic body 110 may be defined as T2.

A method of adjusting T2 and T1 to satisfy $0.76 \leq T2/T1 \leq 0.97$ will be described in detail in a method of manufacturing a multilayer ceramic capacitor (MLCC) according to another embodiment of the present invention as described hereinafter. The MLCC according to an embodiment of the present invention may be implemented by forming a plurality of block laminates and laminating the block laminates during a manufacturing process.

The block laminates may be formed by determining three or more of first and second internal electrodes 121 and 122 as a single block and laminating three or more of a plurality of ceramic green sheets with first and second internal electrode patterns having different widths formed thereon in the same manner.

Thus, the MLCC according to an embodiment of the present invention may satisfy $0.76 \leq T2/T1 \leq 0.97$ and delamination may be prevented, enhancing reliability.

If the value of T2/T1 is less than 0.76, a difference between the longest distance T1 and the shortest distance T2 between the uppermost internal electrode and the lowermost electrode among the plurality of first and second internal electrodes 121 and 122 is increased to cause delamination, or the like, degrading reliability.

If the value of T2/T1 exceeds 0.97, there is little difference between the longest distance T1 and the shortest distance T2 between the uppermost internal electrode and the lowermost electrode among the plurality of first and second internal electrodes 121 and 122 to cause delamination, or the like, degrading reliability.

In particular, according to an embodiment of the present invention, In case that the longest distance between the uppermost internal electrode and the lowermost electrode, among the plurality of first and second internal electrodes 121 and 122, is T1 and the shortest distance therebetween is T2, when $0.85 \leq T2/T1 \leq 0.90$ is satisfied, reliability can be further enhanced.

FIG. 6 is a flow chart illustrating a process of a manufacturing an MLCC according to another embodiment of the present invention.

Referring to FIG. 6, a method for manufacturing a multilayer ceramic electronic component according to another embodiment of the present invention may include: preparing a plurality of ceramic green sheets with slurry including ceramic powder; forming first and second internal electrode patterns having different widths with a conductive paste including a metal powder on the plurality of ceramic green sheets; laminating three or more of the plurality of ceramic green sheets to form a plurality of block laminates; and laminating the plurality of block laminates and firing the same to form a ceramic body including a plurality of first and second internal electrodes, wherein when the longest distance between the uppermost internal electrode and the lowermost internal electrode, among the plurality of first and second internal electrodes 121 and 122, within the ceramic body is T1 and the shortest distance therebetween is T2, $0.76 \leq T2/T1 \leq 0.97$ is satisfied.

The method for manufacturing a multilayer ceramic electronic component according to another embodiment of the present invention will be described except for the characteristics of the multilayer ceramic electronic component according to one embodiment of the present invention as described above, and in particular, it will be described by using an MLCC as an example.

In the method for manufacturing an MLCC according to an embodiment of the present invention, first, a plurality of ceramic green sheets may be prepared with slurry including ceramic powder.

The ceramic powder is not particularly limited and may be, for example, barium titanate ($BaTiO_3$).

Next, first and second internal electrode patterns having different widths may be formed with a conductive paste including a metal powder on the plurality of ceramic green sheets, respectively.

The metal powder may include one or more selected from the group consisting of palladium (Pd), a palladium-silver (Pd—Ag) alloy, nickel (Ni), and copper (Cu).

Thereafter, three or more of the plurality of ceramic green sheets may be laminated to form a plurality of block laminates.

The first and second internal electrode patterns formed on the plurality of ceramic green sheets constituting the plurality of block laminates may have different widths.

Also, the first and second internal electrode patterns may be disposed to have the same form within the respective blocks.

Namely, when a plurality of block laminates are formed by laminating three green sheets, the first internal electrode, the second internal electrode, and the first internal electrode are sequentially laminated, and in this case, the width of the second internal electrode may be greater than that of the first internal electrodes laminated on the upper and lower portions thereof.

Meanwhile, after the plurality of block laminates are formed, compressing the plurality of block laminates may be performed, but the present invention is not limited thereto.

The plurality of block laminates are compressed, respectively, and subsequently laminated. Thus, when the longest distance between the uppermost internal electrode and the lowermost internal electrode, among the plurality of first and second internal electrodes 121 and 122, within the ceramic body is T1 and the shortest distance therebetween is T2, $0.76 \leq T2/T1 \leq 0.97$ may be satisfied.

Namely, compared to a case in which a plurality of first and second internal electrodes of the ceramic body are entirely laminated, compressed, and fired, when the ceramic green sheets with first and second internal electrode patterns having different widths formed thereon are divided into three or more parts to form block laminates and compressed, a step problem can be solved.

Thereafter, the plurality of block laminates are laminated and fired to form a ceramic body including a plurality of first and second internal electrodes.

The ceramic body may be formed through the foregoing process, and in this case, a lamination amount of the plurality of first and second internal electrodes may be 150 layers or more, but the present invention is not limited thereto.

Hereinafter, an embodiment of the present invention will be described in more detail, but the present invention is not limited thereto.

The MLCC according to the present embodiment was manufactured as follows.

First, slurry including powder such as barium titanate ($BaTiO_3$), or the like, having an average particle diameter of 0.1 μm was applied to a carrier film and dried to prepare a plurality of ceramic green sheets having a thickness ranging from 1.05 μm to 0.95 μm to thus form dielectric layers.

Next, conductive paste for internal electrode including nickel powder having an average particle size ranging from 0.1 μm to 0.2 μm was prepared.

The conductive paste for internal electrode was prepared to further include barium titanate ($BaTiO_3$) in addition to the nickel powder.

The conductive paste for internal electrode was coated on the green sheets through a screen printing method to form internal electrodes having different widths, and three or more ceramic green sheets were subsequently laminated to form a plurality of block laminates.

Thereafter, the plurality of block laminates were laminated and, here, a lamination amount of first and second internal electrodes was 300, and a total layer number of the first and second internal electrodes of each of the block laminates was 10.

Thereafter, the ceramic body was compressed and cut to form a 0603-sized chip, and the chip was fired under a reducing atmosphere of $H_2$ 0.1% or less at a temperature ranging from 1,050 to 1,200° C.

Thereafter, a process of forming external electrodes, a plating process, and the like, were performed to fabricate a multilayer ceramic capacitor (MLCC).

A comparative example was manufactured according to a general MLCC manufacturing process.

Results of performing delamination test on the embodiment and the comparative example show that, in the case of the embodiment of the present invention, 100 samples had no delamination defect, while in the case of the comparative example, 38 samples, among 100 samples, had a delamination defect.

As set forth above, according to embodiments of the invention, an increase in a step in a margin portion of a multilayer ceramic electronic component is solved, implementing a multilayer ceramic electronic component having a reduced delamination defect and excellent reliability.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including a plurality of dielectric layers; and
a plurality of first and second internal electrodes disposed to face each other with the dielectric layer interposed therebetween within the ceramic body and having different widths,
wherein three or more of the plurality of first and second internal electrodes form a single block,
a plurality of blocks are iteratively laminated, each block laminate being identical, and
the lowest internal electrode disposed in one block, among the plurality of first and second electrodes disposed in the one block, and the highest internal electrode disposed in the other block adjacent to the one block have the same width, and $0.76 \leq T2/T1 \leq 0.97$, where T1 is the greatest distance between the uppermost internal electrode and the lowermost internal electrode, among the plurality of first and second internal electrodes, and T2 is the shortest distance therebetween, in a cross-section taken in width-thickness (W-T) directions in a region of the ceramic body where the first and second internal electrodes overlap.

2. The multilayer ceramic electronic component of claim 1, wherein an amount of the blocks is 5 or more.

3. The multilayer ceramic electronic component of claim 1, wherein $0.85 \leq T2/T1 \leq 0.90$.

4. The multilayer ceramic electronic component of claim 1, wherein a lamination amount of the plurality of first and second internal electrodes is 150 layers or more.

5. The multilayer ceramic electronic component of claim 1, wherein the internal electrodes include one or more metals selected from the group consisting of palladium (Pd), a palladium-silver (Pd—Ag) alloy, nickel (Ni), and copper (Cu).

6. A method for manufacturing a multilayer ceramic electronic component, the method comprising:
preparing a plurality of ceramic green sheets with slurry including ceramic powder;
forming first and second internal electrode patterns having different widths with a conductive paste including a metal powder on the plurality of ceramic green sheets;
laminating three or more of the plurality of ceramic green sheets to form a plurality of block laminates; and
laminating the plurality of block laminates and firing the same to form a ceramic body including a plurality of first and second internal electrodes,
wherein each block laminate is identical,
the lowest internal electrode disposed in one block laminate and a highest internal electrode disposed in the other block laminate adjacent to the one block laminate, have the same width, and $0.76 \leq T2/T1 \leq 0.97$, where T1 is the greatest distance between the uppermost internal electrode and the lowermost internal electrode, among the plurality of first and second internal electrodes, within the ceramic body, and T2 is the shortest distance therebetween, in a cross-section taken in width-thickness (W-T) directions in a region of the ceramic body where the first and second internal electrodes overlap.

7. The method of claim 6, further comprising: compressing the block laminates after the forming of the plurality of block laminates.

8. The method of claim 6, wherein the first and second internal electrode patterns are disposed to have the same form within the respective blocks.

9. The method of claim 6, wherein an amount of the block laminates is 5 or more.

10. The method of claim 6, wherein $0.85 \leq T2/T1 \leq 0.90$.

11. The method of claim 6, wherein a lamination amount of the plurality of first and second internal electrodes is 150 layers or more.

12. The method of claim 6, wherein the metal powder includes one or more selected from the group consisting of palladium (Pd), a palladium-silver (Pd—Ag) alloy, nickel (Ni), and copper (Cu).

* * * * *